United States Patent Office 3,127,244
Patented Mar. 31, 1964

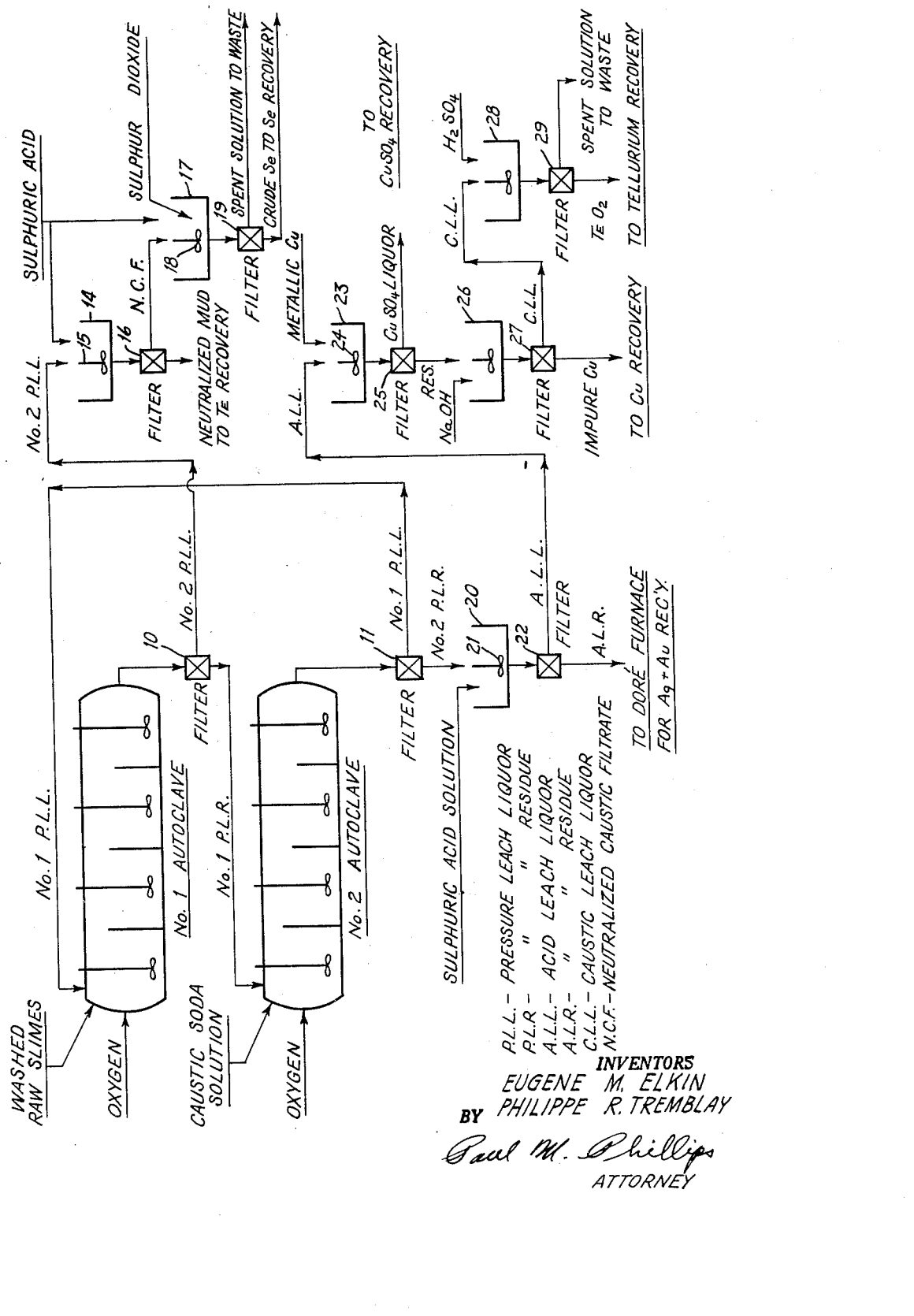

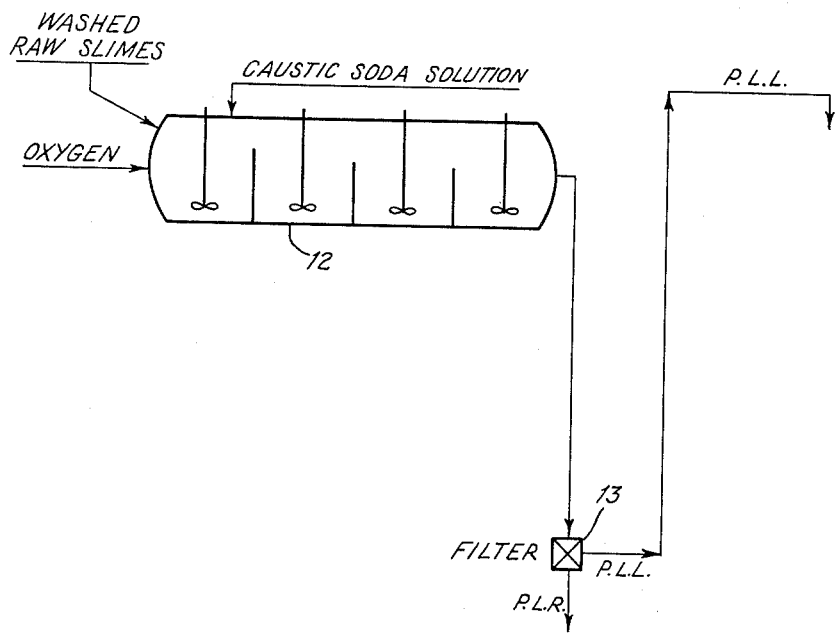

3,127,244
PROCESS FOR SEPARATELY RECOVERING
SELENIUM AND TELLURIUM
Eugene M. Elkin, Montreal, Quebec, and Philippe R. Tremblay, Repentigny, Quebec, Canada, assignors to Canadian Copper Refiners Limited, Toronto, Ontario, Canada, a corporation of Canada
Filed Feb. 2, 1961, Ser. No. 86,698
5 Claims. (Cl. 23—209)

The present invention comprises a process for separately recovering selenium and tellurium from various source material, including particularly the slimes resulting from electrolytic copper refining and which are sometimes referred to as "copper refinery anode slimes." In many instances these slimes contain selenium and sometimes also some tellurium. The present invention provides a process for recovering either selenium alone, in the event that the tellurium present is not sufficient in amount, or for some reason it is not desired to recover tellurium; or in other instances to recover both selenium and tellurium as separate products.

The present process, as will appear more in detail hereinafter, is based upon an oxidizing leach under pressure. This general mode of treating raw materials, including for example, copper refinery slimes, has heretofore been proposed and is disclosed in a Canadian patent to Vaaler, No. 576,716, granted May 26, 1959, and also in U.S. Patent No. 2,990,248, issued June 27, 1961, and corresponding in disclosure to said Canadian patent. In view of the similarity in certain respects between this Vaaler patent and the present process, it is believed desirable to discuss this process to some extent and to bring out essential differences between its basic principles and those of the present process.

Vaaler teaches the leaching under pressure up to 500 pounds more or less (pressures in each instance being measured as pounds per square inch gauge, hereinafter abbreviated "p.s.i.g."). In Vaaler, during the leach there was present a certain partial pressure of oxygen stated as at least 20 p.s.i.g. and sometimes greater. Alternatively, in accordance with Example II thereof, pure oxygen could apparently be used. The leaching reagent used in most instances was caustic soda, which is essentially the same as is used in accordance with the present teaching. The time used for the leach in accordance with Vaaler was, as stated in certain of the claims of the Canadian patent aforesaid, at least five hours and in some instances as much as 72 hours (see Example II).

The basic principle in the Vaaler Canadian patent aforesaid was to effect a separation of selenium and tellurium incident to the leach operation per se and was based upon the principle or discovery that if slimes or other material containing both selenium and tellurium was subjected to leaching for any extensive time, the tellurium would be converted to relatively insoluble sodium tellurate; while selenium would be converted to relatively soluble sodium selenate. Thus, when the product of the leach was filtered or otherwise treated to separate liquids from solids, a substantially complete separation was effected between selenium and tellurium.

The Vaaler patent did not disclose specific ways of thereafter refining the selenium-containing liquid in order to obtain elemental selenium therefrom or of the process for obtaining tellurium from the tellurium-containing solids, but left one to resort to other art for these teachings respectively.

An earlier Vaaler patent, U.S. Patent No. 2,835,558, issued May 20, 1958, and its corresponding Canadian Patent No. 565,436, issued October 28, 1958, describe a process of treating sodium selenate solution for the recovery of selenium. This process involves treatment with a soluble barium compound to precipitate barium selenate, then the treatment of that precipitate with sulphuric acid to convert the barium selenate into the even more insoluble barium sulphate, then the treatment of the selenic acid in the presence of hydrochloric acid with sulphur dioxide to yield elemental selenium.

There are two basic objections to this selenium recovery process. First, it involves the use of a barium or other alkaline earth salt which can be recovered and re-used, if at all, only by a quite difficult and costly process; and second, it involves the use of hydrochloric acid, which, particularly in the presence of other acids, as sulphuric and other materials necessarily present, is highly corrosive and requires the process to be conducted in vessels or other apparatus of particular construction to minimize damage by corrosion, but also is highly objectionable in practice from the point of view of those who must carry on the process. All this entails substantial costs from the point of view of the operator of the process.

A principal object of the present invention is to provide a process by which the selenium is kept to a large extent and with relatively small losses in a valence state such that the difficulties inherent in the selenium recovery process aforesaid and other known processes are obviated, and particularly such that it will be unnecessary to use barium or other alkaline earth salts in recovery of the selenium and further, it will be unnecessary to use hydrochloric acid, so that the accompanying difficulties and costs are wholly avoided.

To do so the selenium is oxidized according to the present process, not to the selenate ($SeO_4$=) or 6-valence state, but rather only to selenite ($SeO_3$=) or a 4-valence state; and the conversion of selenium to a 6-valence state (selenate) is kept at a minimum.

To accomplish these objects the present invention has also provided specific conditions and limitations such that the process as a whole may be carried on in a much shorter time than was taught as possible in accordance with the Vaaler Canadian Patent No. 576,716 aforesaid, so that the process may be carried on using smaller equipment or less of it for a given commercial production, and in general so that costs of operation are kept at a minimum. These comprise, therefore, other and detailed objects of the present invention.

Summarizing the present invention, it comprises basically a process for the recovery of selenium and/or selenium and tellurium from source materials containing selenium or both these elements, wherein each of the elements to be recovered (Se and Te) is initially in a valence state of +2 to —2, both inclusive, and wherein a pressure leach is conducted under the following specific conditions:

(1) Materials present—oxygen (as such) with a partial pressure of about 200–300 p.s.i.g.; oxides of carbon—substantially completely absent; alkali metal hydroxide—present in solution in the liquid portion of an aqueous slurry in an amount greater than that stoichiometrically required to react with all elements of the starting material capable of reacting therewith and preferably 10 to 15% above such stoichiometric amount.

(2) Physical conditions required for pressure leach: temperature—about 275° to about 350° F.; time—from about ½ hour to about 2 hours (aggregate time for all leaching); agitation—sufficient during and preferably throughout the leaching operation to retain the solids in suspension in the liquid present.

The invention will be more readily understood by reference to the accompanying drawings, in which:

FIG. 1 is a flowsheet of a preferred embodiment of the invention; and

FIG. 2 is a somewhat simpler modification of a portion of the flowsheet of FIG. 1 showing but a single leach vessel or autoclave for the pressure-leaching operation as distinguished from a multiple stage leach as indicated in FIG. 1.

The several elements of the present process will now be considered in detail.

The first element discussed is the solid raw material which is supplied to the process. While the present process is specifically adapted for treating slimes from electrolytic refining of copper, it has been found that it is also applicable to other materials containing selenium and/or tellurium, wherein the selenium and/or tellurium are present initially in a valence state between +2 and —2. These materials thus may, for example, be present as selenium sulphide or tellurium sulphide (valence +2); they may to some extent be present in their element state (valence equals zero), but mixed with substantial amounts of impurities or they may be present as selenides or tellurides of some divalent metal as copper or iron (valence equals —2); or in some other state as polyselenides, for example, wherein the valence is more or less indeterminate, but might be calculated to be somewhere between 0 and —2. Such materials other than copper refinery slimes may, for example, accumulate in the gas-cleaning apparatus used in conjunction with sulphuric acid manufacture and also as various residues resulting from different steps in the purification of selenium and consisting to a large extent of iron (ferrous) selenide. It will also be understood that due to the differences between ores from various parts of the world and hence to the various impurities present in copper anodes produced by pyrometallurgy, the slimes from electrolytic copper refining operations will vary widely in composition and character. The present process has been found applicable to a number of different slimes; although there may be a few types that do not lend themselves to satisfactory treatment by this process.

The slimes are introduced into an autoclave or other suitable pressure vessel in a conventional manner. Inasmuch as the autoclaves or other pressure vessels as shown diagrammatically in the accompanying drawings are of a presently conventional form, and as no invention is claimed herein as to the design or construction of such vessels, they have not been shown in detail herein. It will be understood that any suitable vessel capable of withstanding the chemical and mechanical erosion of the materials present at the temperature and under the pressures hereinafter set forth may be used. A preferred type of lining for such vessels is nickel; and vessels made according to the diagrammatic illustration in the drawings have been in use for some time by Sherritt Gordon Mines Limited in Canada and are illustrated, for example, in the publication of the transactions of the Canadian Institute of Mining and Metallurgy for 1955, on page 217. Each of the pressure vessels is diagrammatically illustrated in the accompanying drawings as partially subdivided into several compartments by partitions of varying heights, with the incoming materials supplied to the deepest of these compartments and progressively flowing into compartments having lower dividing walls. Each of the compartments is further provided with an agitating means, shown as a rotary propeller or the like, and arranged to be rotated by suitable power means (not shown).

Referring first to FIG. 1 of the drawings, slimes which preferably have previously been washed to eliminate most of the water-soluble materials therefrom are supplied as indicated by the legend "Washed Raw Slimes" on the drawing to the No. 1 autoclave in a desired amount and are leached therein preferably as an aqueous slurry, the aqueous liquid for making up the slurry, which in this case is the pressure leach liquid coming from the No. 2 autoclave and separated from the solids thereafter, is supplied as indicated by the arrows in FIG. 1 and by the legend "No. 1 P.L.L." This material may be supplied substantially continuously as shown, with suitable arrangements being made so that there is an adequate residence time for the solid material in each portion of the autoclave during its passage therethrough. As shown, the material passes from No. 1 autoclave to a device 10, which is designated "Filter." It will be understood that this device may be any suitable device which will separate liquids from solids and need not necessarily be a "filter" in the strict sense of the word. For example, a suitable centrifugal device is contemplated as being an equivalent of a filtering device at this stage of the process and in fact at substantially all points in the process where a filter is indicated. Any equivalent device capable of separating liquids from solids whether by filtration, decantation, centrifugal action or otherwise is to be considered as equivalent.

The pressure leach liquid (No. 2 P.L.L.) from the device 10 is then conducted to a recovery system for selenium, which will be described hereinafter; while the pressure leach residue is passed to the No. 2 autoclave and en route may be mixed with a fresh alkali solution which, from a broad point of view, is any appropriate alkali metal hydroxide (designated, FIG. 1, by the legend "Caustic Soda Solution"). It will be understood that by reason of availability and economy it is normally contemplated that caustic soda will be used as the alkali metal hydroxide in the present process.

The No. 2 autoclave may be the same as the No. 1 autoclave as shown diagrammatically in the drawings; or may be different therefrom in accordance with the desires of those constructing and operating the plant. As shown, however, the effluent material from the No. 2 autoclave passes to a filter device 11, which may be similar in every essential respect to the device 10 and which separates a pressure leach liquid (designated "No. 1 P.L.L.") supplied to No. 1 autoclave as shown and a pressure leach residue (designated "No. 2 P.L.L.") which is supplied to a second recovery system hereinafter described.

Means are provided for supplying to each of the autoclaves oxygen or an oxygen-containing gas in an amount and under pressure sufficient to maintain the desired partial pressure of oxygen in each autoclave as hereinafter set out. Normally it will be found desirable to supply substantially pure commercially available oxygen to the autoclaves and preferably to supply it not merely at the start of a reaction, but substantially continuously throughout each leaching operation.

It is further contemplated that while substantially continuous leaching operations are indicated in the accompanying drawings which illustrate a preferred form of the invention, the operation could be carried out intermittently on a batch basis. It may also be carried out in a single autoclave as shown, for example, at 12 in FIG. 2 with a single filter device 13 for receiving effluent material from the autoclave 12 and with the alkali metal hydroxide solution supplied along with washed raw slimes or other solid starting materials to the single autoclave.

Furthermore, in the event that a batch process is resorted to, it may be found desirable to carry it on in a plurality of vessels, through which the liquid is passed substantially countercurrent to the solids. Even in a batch operation it is usually necessary to supply oxygen throughout the leaching operation, as oxygen is used up in the course of the reactions taking place during the oxidizing leach as herein taught, not only in oxidizing the selenium and/or tellurium, but also to some extent in oxidizing other oxidizable elements or material present in the original raw materials, or starting material, as it is herein called.

The next essential element which must be present during the leach is the alkali metal hydroxide. The use of an aqueous alkaline solution seems to be essential in obtaining the desired conversion of selenium and/or tellurium to a higher valence state in which it is water-soluble, so that it may be extracted from the other solid materials.

Due to a number of complications which would be involved if ammonium salts were present, ammonium hydroxide is not considered as equivalent to the alkaline metal hydroxides contemplated for use in accordance with the present invention. On the other hand, alkali metals including sodium, potassium, lithium or any mixture therewith are contemplated, in that these metals form soluble selenates and selenites. Due, however, to the relative cheapness of caustic soda, as distinguished from the corresponding potassium and lithium salts, this material is normally preferred and is normally used in the present process. The drawings are correspondingly marked.

The amount of alkali metal hydroxide needed is a variable quantity with different raw materials. This amount can readily be determined by titration or other chemical analytical test, so as to determine that amount which is stoichiometrically equivalent to all the materials present in the slimes or other starting materials which can react with the alkali metal hydroxide present in accordance with the present process. It is normally contemplated that a reasonable excess over the stoichiometric amount, usually about 10 to 15%, but with these percentages not particularly critical, will be used in the process.

The other ingredient which must be present is oxygen, which is used to supply the oxidizing force to bring the selenium and/or tellurium from its initial valence state hereinabove discussed up to a valence state of 4 as to selenium; while preferably holding it down to prevent, to a maximum extent, the oxidation of the selenium to a valence state of 6. In other words, it is desired that in accordance with the present invention that the selenium in the effluent from the autoclaves shall be in the form of sodium selenite ($Na_2SeO_3$), rather than in the form of sodium selenate ($Na_2SeO_4$). The tellurium is probably in the form of either tellurate or tellurite or a mixture of these two.

To accomplish this within a relatively short time as hereinafter discussed, it is practically necessary that oxygen be present with a partial pressure of from about 200 to about 300 p.s.i.g. If this partial pressure of oxygen were provided merely by supplying air to the pressure vessel under the necessary air pressure, the total pressures necessarily involved (from about 1,000–1,500 p.s.i.g.) would be so great and the consequent cost of equipment also so great that the process would be economically of little or no value. It is practically essential, therefore, that the oxygen, at the partial pressures contemplated in accordance with this invention, be supplied as such. This is now feasible due to the availability of liquid oxygen for commercial processing at the present time. On the other hand, the presence of some inert gas or gases is not necessarily fatal to the present process except, however, that the presence of oxides of carbon, such as carbon monoxide or carbon dioxide is generally undesired, at least in any substantial amounts. Our present theory in support of this is that carbon monoxide would be undesirable by reason of the potential explosive character of mixtures of this gas with oxygen; while carbon dioxide is believed, in accordance with some tests which have been made, to tend to cause selenium to be oxidized to the selenate state, i.e. a 6-valence state, which is undesired according to the present process. On the other hand, the presence of relatively small or trace amounts of carbonaceous materials or gases would probably be substantially immaterial in the present process as far as is now known.

The limits for partial pressure of oxygen herein set out are chosen for the following reasons:

As to the lower limit, it is found that if the partial pressure of oxygen is substantially below about 200 p.s.i.g., the desired reaction becomes so slow that the time required to attain a desired leach is greatly prolonged. Also, as hereinafter set out, time works against the desideratum in the present process of preventing the oxidation of selenium to a 6-valence state, so that a substantially minimum time is desired.

The higher limit for oxygen pressure is chosen for two reasons: first, because increasing partial pressures of oxygen tend to cause more and more conversion of selenium to a 6-valence state, which is undesired according to the present process; and second, because as the pressure of oxygen is increased the total pressure in the vessel or autoclave is correspondingly increased, and the cost and size of the equipment are correspondingly higher. It is desired, therefore, to minimize the cost of equipment, while affording the necessary size for the normal capacity for the process.

The partial pressure of oxygen during the pressure leach has been particularly discussed, as this is the important element of the total gaseous pressure present. It is inevitable, however, in any operation wherein there is an aqueous liquid contained in a pressure vessel that there be also a partial pressure of water. This partial pressure is, of course, a function of temperature and also of the chemical composition of the aqueous liquid.

In a preferred form of the present invention the only gases deliberately introduced and/or present are oxygen and water vapor, even though slight or trace amounts of other substantially inert gases may also be present. Thus, from a preferred point of view, the total pressure may be said to consist essentially of the partial pressures of oxygen and of water vapor. The total pressures or actually-attained pressures during some of the experimental runs which have been made to illustrate various phases of the present invention will be set out in examples which follow.

The temperatures at which the present pressure leach step of the reaction takes place are preferably in the range of about 275°–300° F. The reasons for choosing these temperature limits are that as to the lower limit, it is found that the rate of reaction is quite slow, as here as in many other chemical reactions, this rate is a function of temperature. At temperatures substantially below this lower limit, the rate becomes so slow that the whole operation is impracticable on the one hand; and second, as this temperature goes down, the time for attaining a reasonable conversion of a substantial amount of the selenium is increased; and again, as time is increased, the conversion of selenium to the selenate state is increased. Here again it is desired to minimize the time, so as to minimize the conversion of selenium to selenate and also to provide a maximum production for a given amount of equipment, which is obviously a function of time.

The higher temperature limit is chosen on the basis that as the temperature rises, the conversion of selenium to the selenate state rises substantially. Thus, at temperatures substantially above the upper limit herein given, the conversion of selenium to the selenate state reaches undesired values and hence puts a practical limit on the present process. For these same reasons, the preferred temperature for the pressure leach step of the present process is about 300° F.

The time for the pressure leach step or the aggregate times for all the pressure leaching of any given unit or increment of the starting material is preferably from about ½ hour to about 2 hours. The effect of time has been discussed to some extent hereinabove. It is, of course, a function of both temperature and pressure and also is a function of the amount of selenium which it is desired to solubilize, it being noted that as temperatures are increased and as pressures are increased, times may be correspondingly shortened respectively and vice-versa. It also must be recognized that due to the different ways in which selenium and/or tellurium may be combined in different source materials used in the process, some materials will require much longer times than others in order to get the same amount or percentage of extraction of selenium or tellurium. It has been shown experimentally that as the times are increased, there comes a point where the conversion of selenium to the selenate state rises to undesired values. The present invention seeks to avoid this and in particular seeks to avoid converting more than about 3% of the selenium present to the selenate state. The times must be held down accordingly and other interrelated conditions suitably adjusted in view of the times chosen, all as aforesaid. It has also been shown by actual tests that, other conditions being the same, more selenium is extracted in a multiple stage leaching extraction process as shown in FIG. 1 than in the same total time with a single stage leach as shown in FIG. 2. Thus, for example, in the two-stage process as shown in FIG. 1, more selenium is extracted using a ½ hour in each stage than using one hour in the single stage process shown in FIG. 2. It has also been proven that during a leach of one hour in each of two stages as shown in FIG. 1, more selenium is solubilized than during a single leach of two hours in a single stage leach process as shown in FIG. 2.

It has been found that agitation plays a very important part in the rate of reaction during the pressure leach operation. For example, when this step was conducted on a batch basis in a relatively small autoclave with an agitator therein rotated at 300 r.p.m., it was found that the rate of reaction was less than half that attained when the speed of rotation of the same agitator was increased to 600 r.p.m. In general, agitation is a function of the size and character of the agitator with respect to the size and character of the vessel in which it is operating. As such, the principle which is of general applicability is that for maximum efficiency, the agitation must be sufficient so that substantially all the solid materials present are retained in suspension in the liquid and so that the liquid and solids are kept in substantially continuous motion, preferably throughout the leach operation. This is borne out by the fact that in the same set of experiments set out above, increase in rotational speed of the same agitator substantially over 600 r.p.m. produced substantially no increase in the rate of the reaction. Thus there is a definite level or degree of agitation beyond which further agitation seems to be of relatively little value. Also, any increases in the rate of agitation results in a substantial increase in the cost of such agitation. Thus, for example, cost increases are incurred corresponding almost to the cube of the speed of rotation. It will be found for any given installation that there will be a degree of agitation such that the solids are kept in suspension and the slurry is kept in continuous motion, beyond which it will be impracticable to go in a commercial installation due to the greatly increasing costs beyond this point, with relatively few improved results to be attained thereby.

A theory has also been formulated as to agitation; that the effect of agitation is in part at least to "beat" the oxygen into solution and thereby assist in transferring it to the slimes particle, so that when the degree of agitation is adequate, a much greater absorption of oxygen by the slimes particles is attained and a more rapid oxidation of the selenium and tellurium content thereof is secured. The desired intensity of agitation is apparently one which is a function of the number, size and shape of the agitators with respect to the size, shape and amount of contents in the pressure vessel in question and is not susceptible of accurate definition. It is considered that a substantial minimum requirement is that the agitation should be sufficient to maintain substantially all the solid particles in suspension in the liquid during and substantially throughout the leaching operation.

The effluent material from the leaching step is preferably separated into a solid or residue portion known as "P.L.R." (standing for pressure leach residue) in the drawings and a liquid portion identified as "P.L.L." (standing for pressure leach liquor). There is also on the drawing an explanation of these and other symbols. The liquid fraction (P.L.L.) is then taken to a first recovery section. This fraction contains a majority of the selenium present in the raw material, usually from 65–80%, but still contains a substantial amount, perhaps 10–20%, of the tellurium originally present in the raw materials supplied to the process. Thus, in the present process, as distinguished from that process set out in Canadian patent No. 576,716 to Vaaler, the pressure leach step is not relied upon to separate selenium and tellurium; but rather, this separation is effected later by means hereinafter described and which means are to a certain extent similar to previously known methods. By disregarding the requirement for effecting a complete separation of selenium and tellurium during the pressure leach in accordance with the present invention, it is possible to keep substantially all the selenium extracted in a 4-valence state form (SeO$_3$=) as sodium selenite, for example, rather than permitting most, if not all, of it to be oxidized up to a 6-valence form (SeO$_4$=) as sodium selenate.

Turning now to FIG. 1 of the drawings, the P.L.L. fraction from the filter device 10 or its equivalent is taken to a vessel 14, wherein sufficient acid is added to neutralize the alkali therein, this acid being preferably sulphuric acid. In any event, the purpose is to neutralize the alkali present and bring the liquid to a substantially neutral condition. A suitable agitator 15 may be employed in this vessel 14 for assuring adequate mixing of the materials and subsequent substantial uniformity of the material within the vessel 14. Neutralization of the pressure leach liquid at this stage of the process results in precipitation of many of the materials present to yield what may be termed a "neutralized mud." This mud or precipitation contains a negligible amount of selenium and substantially all the tellurium present, which, it is believed, is in the form either of sodium tellurite and/or tellurate or a hydrated tellurium oxide or combinations of these materials or some of them. In any event, the tellurium is in the form of one or more substantially insoluble compounds at this stage of the process and may be separated from the neutralized caustic filtrate (N.C.F.) by suitable filter means 16 or its equivalent, with the equivalencies being as hereinabove set forth. Tellurium may be recovered from this neutralized mud by conventional process, or any desired process or processes, forming no part of the present invention and which, therefore, are not set out herein in detail.

The "N.C.F." (neutralized caustic filtrate) liquid may then be taken to a zone or vessel 17 which may, if desired, be provided with agitator 18 and wherein the liquid may be acidified, for example, by adding further sulphuric acid and sulphur dioxide passed through the liquid so as to precipitate elemental selenium. It is believed that the reaction occurring in this vessel in an acidified aqueous liquid is according to the equation:

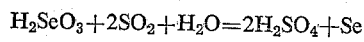

$$H_2SeO_3 + 2SO_2 + H_2O = 2H_2SO_4 + Se$$

The elemental selenium may then be separated from the other materials present, substantially all of which are soluble, and repurified to the extent desired or found necessary by the conventional methods.

It is noted that this process in accordance with the equation above takes no account of selenium present in the form of sodium selenate or selenic acid (as SeO$_4$=). These materials which are soluble in water are not reduced to elemental selenium to a substantial extent under the conditions here present and hence the selenium present in this form, i.e. a 6-valence form, is wasted, as it leaves the process to waste as indicated by the separation made at a filter device 19 to which the effluent from the vessel 17 is passed. For this reason, therefore, it is important in accordance with the present invention that the amount of selenium converted to this 6-valence form be minimized as all that is converted is wasted in accordance with the present process. A practical maximum for selenium in selenate form has been found to be about 3% of the selenium originally present in the starting material.

Turning now to the other recovery process which is carried on with respect to the residue portion separated by the filtering device 11 of FIG. 1 or its equivalent, or by the filtering device 13 of FIG. 2 or its equivalent, the P.L.R. (pressure leach residue) fraction is taken to a vessel 20 which may be provided with an agitator 21 and there is added thereto a sufficient amount of sulphuric acid so as to acidify the mixed P.L.R. and acid to a pH of about 1 or less. This results in the solution of some of the materials present to include substantially all the tellurium compounds; while dissolving a negligible amount of the selenium compounds which may be present at this stage of the process. Thus, when the product or effluent from the vessel 20 is separated by a filter 22 or its equivalent into an acid leach liquid (A.L.L.) and an acid leach residue (A.L.R.), the latter contains substantially all the selenium and some of the tellurium which were not solubilized during the pressure leach operation hereinabove described and sent to the first recovery system shown at the upper right portion of FIG. 1. The remaining selenium and tellurium in whatever form or forms they may be, plus the silver and gold and metals of the platinum group, if present, are contained in the acid leach residue (A.L.R.) and may be transmitted to a doré furnace (a small refractory furnace for the recovery of silver, gold, metals of the platinum group and some of the selenium and tellurium which may be present and which is preferably operated in accordance with conventional prior art practice). It is also contemplated that other methods of recovering the valuable constituents of the acid leach residue (A.L.R.) may be and sometimes are resorted to. Inasmuch, however, as all these methods are old and known to the art, at least from the point of view of the present invention, none of them will be described in detail. It is noted that in some instances where perhaps 70 to 80% of the selenium is recovered by solubilizing during the pressure leach step and the recovery carried on as hereinabove set out, a large portion of the remaining selenium may be recovered commercially by the use of a doré furnace and other associated process steps and equipment.

The acid leach liquor (A.L.L.) from the filter or liquid-solid separation device 22 may be taken to a vessel 23 which may be provided with an agitator 24 as indicated. Metallic copper is supplied to the vessel 23. The acid solution supplied to the vessel 23 (the acidification having taken place in the vessel 20 as aforesaid), serves to cement out a solid material onto the metallic copper present and to dissolve some of the copper in the remaining solution as copper sulphate. This copper sulphate liquid may then be separated from the solid materials by a filter device 25 or its equivalent as aforesaid and subsequently purified to provide a copper sulphate product which may be used for any desired purpose. The solid materials remaining at this stage are then passed to a vessel 26 and caustic soda or other alkali metal hydroxide is supplied; the resulting mixture being then boiled. This results in the solution of substantially all the tellurium contained in the mud or precipitated on the metallic copper, so that upon separation of the resulting solution from the remaining solids by a filter device 27 or the like, there is formed a caustic leach liquor (C.L.L.) containing substantially all the tellurium present and there remains as solids an impure copper, which may thereafter be recovered and/or reused in any suitable manner. The C.L.L. solution may then be taken to a further vessel 28 and further purified, for example, by adding sulphuric acid to precipitate out the tellurium, probably in the form of a hydroxy acid. This is indicated on the drawing as $TeO_2$, but may not correspond exactly to that formula. This precipitate may suitably be separated from the remaining liquid by a filtering device 29 or the like and the spent solution from this separating device 29 discarded to waste. The tellurium may thereafter be purified and/or converted to an elemental state in any way conventional in the art and which per se forms no part of the present invention.

The process is further illustrated by a number of examples which follow.

EXAMPLE 1

This example is given to illustrate the differences in the solubilizing of selenium and tellurium from different samples of the same electrolytic copper refinery slime material containing both these elements, comparing the one stage leaching of FIG. 2 with the two-stage leaching of FIG. 1. In each leaching operation, including both one and two-stage leachings, the conditions in each autoclave were maintained as follows: temperature 300° F., partial pressure of oxygen 250 p.s.i.g., total pressure 300 p.s.i.g. (the difference between oxygen partial pressure and total pressure consisting essentially of water vapor).

The results of the leaching with the percentages of selenium and tellurium solubilized in each instance are given as percentages of the total selenium and tellurium initially present and are set forth in Tables I and II which follow.

Table I
1-STAGE LEACHING

| Time, Hours | Percent Se in P.L.L. | Percent Te in P.L.L. |
|---|---|---|
| 0.25 | 62.1 | 24.2 |
| 0.5 | 65.7 | 24.2 |
| 1 | 71.2 | 18.4 |
| 2 | 76.2 | 9.0 |
| 3 | 77.1 | 6.3 |

Table II
2-STAGE LEACHING

| Time, Hrs. (ea. stage) | Percent Se in P.L.L. | | | Percent Te in P.L.L. | | |
|---|---|---|---|---|---|---|
| | Stage 1 | 2 | 1+2 | Stage 1 | 2 | 1+2 |
| 0.25 | 65.1 | 10.9 | 76.0 | 13.2 | 8.2 | 21.4 |
| 0.5 | 68.1 | 12.8 | 80.9 | 10.4 | 6.1 | 16.5 |
| 1 | 70.6 | 13.0 | 83.6 | 7.9 | 5.2 | 13.1 |
| 2 | 71.3 | 14.1 | 85.4 | 3.6 | 2.2 | 5.8 |
| 3 | 73.0 | 17.6 | 90.6 | 1.8 | 2.6 | 4.4 |

From the foregoing it is clear that when using a half hour leach time in each of two stages, a greater amount of selenium is solubilized than when using a one hour leach in a single stage; or in other words, a multi-stage leach is generally superior to a single stage leach.

As to tellurium, the foregoing data given in Tables I and II, and the results of a number of other tests which have been made indicate that tellurium is initially oxidized from the state or states in which it occurs in the slimes, i.e. wherein the tellurium has a valence between $+2$ and $-2$, both inclusive, so as to convert the tellurium to water-soluble sodium tellurite, $Na_2TeO_3$. This is based upon the use of sodium hydroxide as the alkali present. However, further oxidation, which takes place after additional time is provided and also under other conditions tending to promote such oxidation, including higher partial pressure of oxidation and/or higher temperatures, apparently converts the sodium tellurite to sodium tellurate ($Na_2TeO_4$), which is insoluble and precipitates from the solution. This is apparently the reason that the percentage of tellurium in the pressure leach liquor as indicated in Tables I and II aforesaid is progressively less as times are increased, other conditions remaining the same.

EXAMPLE 2

This example illustrates in detail the operation of the present process under the preferred conditions, the process being that specifically disclosed in FIG. 1 of the drawings as to the sequence of operations and the conditions present during each leaching operation being as follows: temperature 300° F., pressure total 300 p.s.i.g. made up of 250 p.s.i.g. oxygen partial pressure and 50 p.s.i.g. water vapor partial pressure and time, 0.5 hour in each of two stages. In the tests set out in this example the slimes contained 31.2% copper, 16.4% selenium, 4.9% tellurium and 6.3% lead. The data hereinafter given is calculated as weight in pounds based upon an initial charge of 100 pounds; while percentages of extraction are given in terms of percentages of the materials which were initially present, as aforesaid and which were rendered soluble by the reactions during leaching.

The extraction of the several materials during the first stage pressure each alone (not including the materials previously extracted and in solution in the liquid as supplied to the first stage pressure leach) was as set out in Table III which follows.

*Table III*

|    | Percent | Pounds |
|----|---------|--------|
| Se | 68.1    | 11.2   |
| Te | 10.4    | 0.5    |
| Pb | 1.8     | 0.1    |

Corresponding data as to the extraction during the second stage of pressure leaching is set out in Table IV which follows.

*Table IV*

|    | Percent | Pounds |
|----|---------|--------|
| Se | 12.8    | 2.1    |
| Te | 6.1     | 0.3    |
| Pb | 68.1    | 4.3    |

When these results are combined they give the data set out in Table V as follows:

*Table V*

|    | Percent | Pounds |
|----|---------|--------|
| Se | 80.9    | 13.3   |
| Te | 16.5    | 0.8    |
| Pb | 1.8     | 0.1    |

In this operation it is noted that lead is reprecipitated when the solution from the second stage leach is returned to the first stage, where it acts upon fresh slimes.

The pressure leach residue (P.L.R.) resulting from the two-stage leaching operation contained the following amounts of the several elements (based upon a 100 pound original sample of raw slimes, these results being obtained by calcualtion from the smaller quantity test which was carried on): copper 31.2 lbs., selenium 3.1 lbs., tellurium 4.1 lbs., and lead 6.2 lbs.

As set out in the application, the pressure leach residue was then acidified with sulphuric acid, in this case a 15% solution thereof being used; and the acid slurry thus formed was then separated into an acid leach liquor (A.L.L.) and an acid leach residue (A.L.R.) having the contents in percentages (based upon the amount of the respective materials originally present and in pounds based upon a 100 lb. starting material sample) as set out in Table VI as follows:

*Table VI*

|    | Acid Leach Liquor | | Acid Leach Residue (to doré furnace) | |
|----|---------|------|---------------|------|
|    | Percent | Lbs. | Percent left  | Lbs. |
| Cu | 98.2    | 30.6 | 1.8           | 0.6  |
| Se | trace   | 0.6  | 19.1          | 3.1  |
| Te | 69.7    | 3.4  | 13.8          | 0.7  |
| Pb | nil     | 0    | 98.2          | 6.2  |

The A.L.L. was then treated as set out above and the tellurium values therein recovered.

A major portion of the remaining selenium and tellurium in the acid leach residue may be extracted and recovered from the material supplied to the doré furnace by processes which have now become conventional in the art and which, therefore, are not set out in detail herein.

EXAMPLE 3

This example is given to illustrate the effect of temperature on the extraction of selenium and tellurium and particularly its effect in converting selenium to selenate or the 6-valence state. The result of a number of comparable tests using all the same conditions, but with temperature only varied, is set out in Table VII which follows.

*Table VII*

| Temp., °F. | Percent Extracted | | | Percent Se as SeO₄ |
|------------|---------|---------|---------|---------|
|            | Se in P.L.L. | Te | | |
|            |          | in P.L.L. | in A.L.L. | |
| 250        | 30.2     | 48.5      | 7.7       | trace |
| 275        | 54.2     | 22.8      | 21.6      | trace |
| 300        | 71.2     | 6.1       | 69.7      | 1.9   |
| 325        | 77.1     | 3.7       | 80.8      | 7.5   |
| 350        | 79.8     | 2.8       | 83.2      | 15.9  |
| 400        | 80.9     | 2.0       | 84.0      | 39.8  |

From this table it will be evident that when the temperature substantially exceeds 300° F., the amount of selenium oxidized to selenate is excessive.

EXAMPLE 4

The purpose of this example is to illustrate the effect of the use of different partial pressures of oxygen on the extraction of selenium and tellurium and also on the conversion of selenium to a 6-valence or selenate state. The total pressure in each instance is the partial pressure of oxygen as aforesaid plus the partial pressure of water vapor under the conditions of the tests. All conditions were kept constant and as set out in Example 2 with the exception of the partial pressure of oxygen, throughout all the tests. The data resulting from this series of tests is given in Table VIII which follows.

*Table VIII*

| Partial Pressure of Oxygen, p.s.i.g. | Percent Extracted | | | Percent Se as SeO₄ |
|------------|---------|---------|---------|---------|
|            | Se in P.L.L. | Te | | |
|            |          | in P.L.L. | in A.L.L. | |
| 100        | 39.0     | 53.5      | 1.2       | trace |
| 150        | 52.4     | 69.8      | 1.7       | trace |
| 200        | 65.9     | 58.0      | 7.4       | 0.8   |
| 250        | 71.2     | 18.4      | 69.7      | 1.9   |
| 300        | 74.3     | 6.1       | 79.8      | 3.1   |
| 350        | 76.8     | 2.3       | 82.2      | 5.4   |
| 400        | 78.1     | 1.9       | 84.2      | 10.6  |

EXAMPLE 5

This example is given to show the effect of extraction time on the leaching operation, other conditions being held constant as far as possible and the same raw materials being used. The results of these tests are set out in Table IX which follows.

Table IX

| Time, hrs. | Percent Extracted | | | Percent Se as SeO4 |
|---|---|---|---|---|
| | Se in P.L.L. | Te in P.L.L. | Te in A.L.L. | |
| .25 | 62.1 | 24.2 | 44.2 | trace |
| .5 | 65.7 | 24.2 | 52.8 | trace |
| 1 | 71.2 | 18.4 | 62.2 | trace |
| 1.5 | 73.8 | 12.8 | 69.1 | trace |
| 2 | 76.2 | 9.0 | 72.3 | 1.1 |
| 3 | 77.1 | 6.3 | 73.7 | 4.3 |

Various other experiments have been conducted to determine the effects of a number of other variables. Thus, tests have been run to determine the lower limit of temperature at which the leaching operation can be carried on. From these tests, it appears that the lower limit is not critical, but probably is about 250–275° F. As this temperature is reduced, the operation is slowed down to the point where it becomes economically impracticable. Thus, successful operations from a practicable point of view cannot be carried on below about 250° F., and even at that temperature, the economics of the process are extremely questionable. On the other hand, there does not appear to be a narrowly critical low limit of temperature, but rather such limit is dictated primarily by economic considerations.

While it is possible to operate with other alkali metal hydroxides than the sodium hydroxides with which all the experimental work herein reported has been carried on, sodium hydroxide is so much cheaper and usually more readily available than are other alkali metal hydroxides such as potassium or lithium, so that sodium hydroxide is normally preferred.

Also, in neutralizing or acidifying the alkaline products from the pressure leach operations (P.L.L. and P.L.R.), normally sulphuric acid is used. It is possible, but usually not as practical, to effect such neutralization and/or acidification with sulphur dioxide or with an aqueous solution thereof, i.e. sulphurous acid. As to the use of other mineral acids in this connection in lieu of sulphuric acid, nitric acid is not practical for technical reasons; phosphoric acid is technically possible, but is economically impracticable by reason of its much higher cost; and hydrochloric acid, while possibly usable, in some instances is generally undesired for reasons set out hereinabove in this case and also in general is more expensive than is sulphuric acid.

While but two embodiments of the invention have been disclosed herein, an attempt has been made as the description has proceeded and in the examples to point out alternatives at points in the process where such alternatives are feasible or permissible. We do not wish to be limited, however, except by the scope of the appended claims, which are to be construed validly as broadly as the state of the art permits.

What is claimed is:

1. The process of recovering selenium from a starting material in which the selenium exists in at least one form having a valence between plus two and minus two, comprising the steps of subjecting finely divided and dispersed said starting material to an oxidative alkaline pressure leach as an aqueous slurry, in the presence of gaseous elemental oxygen at a partial pressure of about 200 to 350 p.s.i.g. and in the substantial absence of oxides of carbon, and wherein said aqueous slurry has dissolved therein an amount of an alkali metal hydroxide about 10% to 15% greater than the amount required stoichiometrically to react with all ingredients of said starting material capable of reacting with said alkali metal hydroxide, while holding the temperature during said leach within the range of about 275°–300° F., and wherein said leach is carried on for a total period of about one-half hour to about three hours, agitating said aqueous slurry during said leach sufficiently so as to keep the solid ingredients of said slurry in suspension in the aqueous liquid portion thereof, and thereby converting a major portion of the selenium present into the form of selenite ($SeO_3^=$), while keeping the conversion of selenium to selenate ($SeO_4^=$) to not over about 3% of the total selenium present; separating the aqueous liquid, now containing substantially all of the selenium in said starting material in the selenite form, resulting from said leach from the remaining solid material; and recovering elemental selenium from the selenite-selenium in said separated liquid, by adding sulphuric acid thereto in an amount sufficient to bring it to a substantially neutral condition and thereby precipitating a neutralized mud, separating this mud from the remaining liquid, and reducing the selenite-selenium in said remaining liquid to elemental selenium by passing sulphur dioxide therethrough and all in the substantial absence of any materials capable of supplying chloride ions to said remaining liquid.

2. The process in accordance with claim 1, in which said starting materials contain substantial amounts of tellurium in at least one form having a valence between plus two and minus two; and in which both said neutralized mud and said remaining liquid contain both selenium and tellurium, both of which may thereafter be recovered from said neutralized mud and from said remaining liquid.

3. The process in accordance with claim 1, in which the partial pressure of oxygen present during the pressure leach is in the range of about 225–275 p.s.i.g.

4. The process in accordance with claim 1, in which said alkaline pressure leach is carried on in part in each of a plurality of zones, leach liquid being passed through said zones in a manner substantially countercurrent to the movement of solid materials therethrough; and in which the time for said pressure leach is the aggregate time in which solid materials are exposed to leach liquid in all of said zones.

5. The process in accordance with claim 1, in which the total pressure to which the materials are subjected during the pressure leach operation is due to the partial pressure of oxygen plus the partial pressure of water incident to the temperature at which the pressure leach is conducted.

References Cited in the file of this patent

UNITED STATES PATENTS

| 2,378,824 | Betterton | June 19, 1945 |
| 2,981,595 | Tuwiner | Apr. 25, 1961 |
| 2,981,603 | Tuwiner | Apr. 25, 1961 |

FOREIGN PATENTS

| 576,716 | Canada | May 26, 1959 |
| 584,739 | Canada | Oct. 6, 1959 |